US011893452B2

(12) United States Patent
Noel et al.

(10) Patent No.: US 11,893,452 B2
(45) Date of Patent: Feb. 6, 2024

(54) QUANTUM CIRCUIT WITH TAILORED RYDBERG STATES

(71) Applicant: ColdQuanta, Inc., Boulder, CO (US)

(72) Inventors: Thomas William Noel, Lafayette, CO (US); Mark Saffman, Madison, WI (US); Matthew Ebert, Madison, WI (US)

(73) Assignee: ColdQuanta, Inc., Boulder, CO (US)

( * ) Notice: Subject to any disclaimer, the term of this patent is extended or adjusted under 35 U.S.C. 154(b) by 269 days.

(21) Appl. No.: 17/173,985

(22) Filed: Feb. 11, 2021

(65) Prior Publication Data

US 2021/0406751 A1    Dec. 30, 2021

Related U.S. Application Data

(60) Provisional application No. 63/044,116, filed on Jun. 25, 2020.

(51) Int. Cl.
*G06N 10/40* (2022.01)
*G06N 10/00* (2022.01)

(52) U.S. Cl.
CPC .................. *G06N 10/00* (2019.01)

(58) Field of Classification Search
CPC .............. G06N 10/00; G06N 10/40
See application file for complete search history.

(56) References Cited

U.S. PATENT DOCUMENTS 9,934,469 B1 * 4/2018 Jau .................. G06N 10/00
10,504,033 B1 12/2019 King 2020/0185120 A1 * 6/2020 Keesling Contreras .. G02F 1/11
2021/0272005 A1 * 9/2021 King ..................... G06N 10/00
2022/0292382 A1 * 9/2022 Heshami ................ G02B 1/00

OTHER PUBLICATIONS

S.S. Batsanov, Van Der Waals Radii of Elements, Inorganic Materials, vol. 37, No. 9, 2001, pp. 871-885.

* cited by examiner

*Primary Examiner* — Nghia M Doan
(74) *Attorney, Agent, or Firm* — Van Pelt, Yi & James LLP; Clifton Leon Anderson (57) ABSTRACT

In the context of gate-model quantum computing, atoms (or polyatomic molecules) are excited to respective Rydberg states to foster intra-gate interactions. Rydberg states with relatively high principal quantum numbers are used for relatively distant intra-gate interactions and require relatively great inter-gate separations to avoid error-inducing inter-gate interactions. Rydberg states with relatively low principal quantum numbers can be used for intra-gate interactions over relatively short intra-gate distances and require relatively small inter-gate separations to avoid error-inducing inter-gate interactions. The relatively small inter-gate separations provide opportunities for parallel gate executions, which, in turn, can provide for faster execution of the quantum circuit constituted by the gates. By using Rydberg states with relatively high principal quantum numbers where required, and Rydberg states with relatively low principal quantum numbers where possible, an optimal tradeoff between intra-gate interaction flexibility and inter-gate parallelism can be achieved.

16 Claims, 8 Drawing Sheets

Interaction Profilies for Atoms in 50S Rydberg State

Interaction Profilies for Atoms in 70S Rydberg State

QUANTUM CIRCUIT WITH TAILORED RYDBERG STATES

BACKGROUND

Whereas classical digital computers manipulate bits of information, quantum computers manipulate qubits. Both classical bits and quantum qubits can be represented physically using two-state carriers. Examples of two-state quantum carriers include an electron that can assume a spin up and a spin down state, and an electron in an atom that can assume either of a ground state or an excited state. A classical two-state carrier assumes one of the two states at any given time; a quantum two-state carrier can be in a coherent superposition of both states simultaneously.

In gate-model quantum computing, quantum-state carriers are manipulated to implement quantum gates that collectively constitute a quantum circuit. As they are manipulated, the quantum-state carriers typically progress through a series of highly correlated collective many-body superposition states. The end results can be converted (which typically incurs a loss of information) to a form accessible by classical computers and devices. Quantum-state carriers in superposition can suffer from decoherence and a concomitant loss of superposition-dependent information. Durations over which coherence can be relied on can typically last only a fraction of a second. Accordingly, there is a high priority given to minimizing the time to completion and conversion to the classical domain for quantum computations.

Quantum computers vary in the underlying technology used to physically represent the qubits; thus, depending on the underlying technology, the quantum-state carriers can be superconducting circuits, ions, cold-neutral atoms, or other entities. One of the advantages of using cold atoms or ions is that atoms of the same element and atomic weight are naturally identical so that manufacturing tolerances are not an issue (as they may be when the qubits are defined in states of superconducting circuits). Another advantage of cold atoms is that they can be packed closely together without interacting, in contrast to, for example, ions. On the other hand, neighboring cold atoms can be made to interact by causing them to enter Rydberg (very high excitation) states. Thus, cold atoms readily provide for relatively large qubit-count quantum memories, e.g., with hundreds and thousands of qubits. The relatively large quantum memories can accommodate more complex quantum circuits, which in turn increase the importance of high throughput to complete a computation before decoherence interferes.

DETAILED DESCRIPTION

The present invention provides for tailoring Rydberg states and their associated interaction profiles to enhance quantum-computing throughput. In other words, instead of using the same Rydberg state to foster all interactions for a quantum circuit, different Rydberg states can be used, e.g., based on the distances over which the interactions are to occur. In its various aspects, the present invention provides a quantum circuit program that calls for the different Rydberg states, a quantum-circuit execution process, a quantum-circuit execution system, a compiler (e.g., transpiler) process for generating the quantum circuit program, and a compiler system for generating the quantum circuit program.

Figure 1:
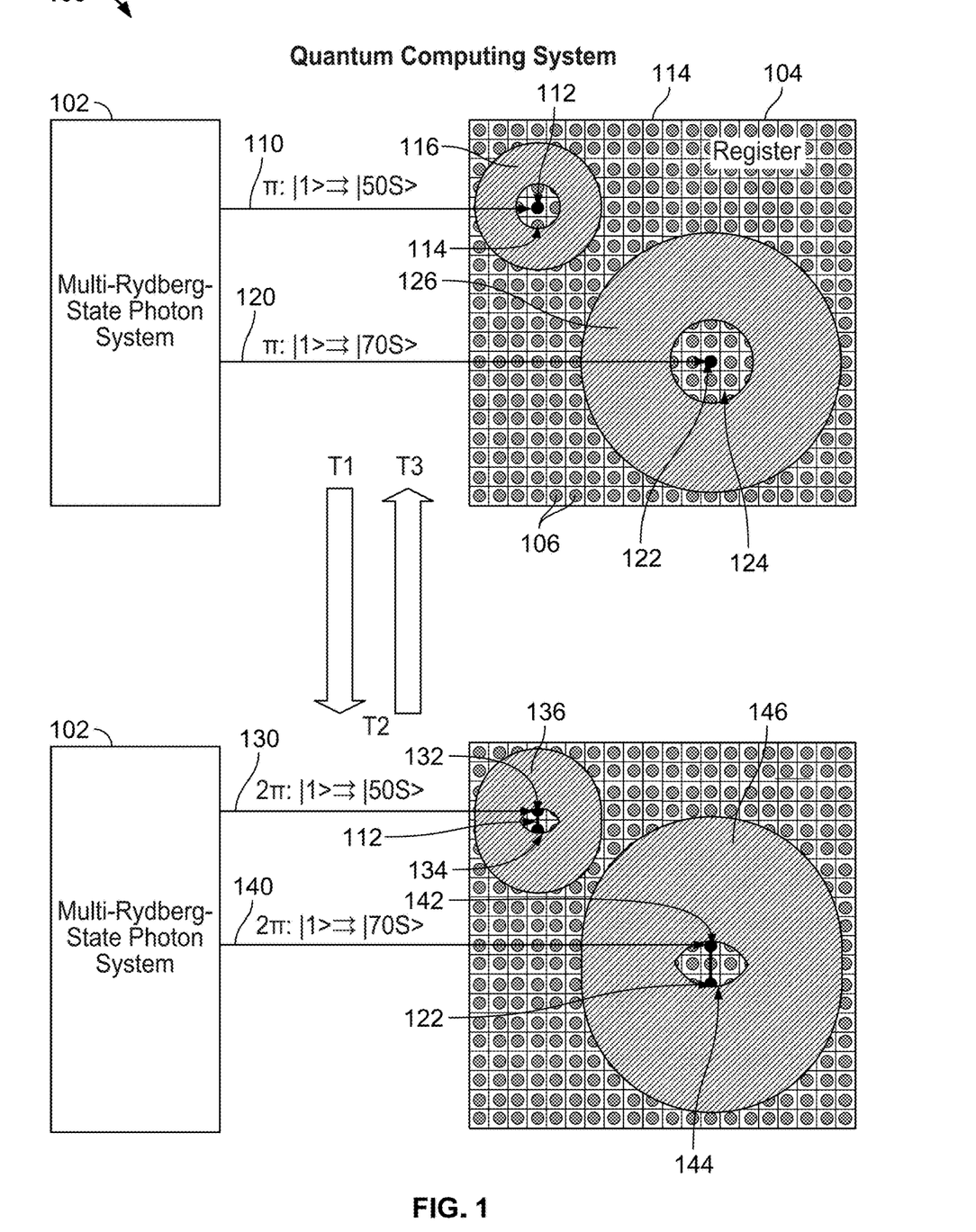
FIG. 1 is a schematic view of a quantum computing system at different times.

A quantum computing system 100, shown in FIG. 1, includes a multi-Rydberg-state photon system 102 and a quantum register 104 populated with quantum carriers, in this case, cesium 133 atoms 106. Photon system 102 can address individual atoms to cause them to transition between quantum states, e.g., including a ground state (e.g., representing 0), an excited state (e.g., representing a 1), and each of two or more Rydberg states with respective principal quantum numbers. Herein, the ground state is represented in Dirac notation |0> and the excited state is represented in Dirac notation as |1>, whereas Rydberg states, e.g., |50S>, and |70S>, are represented by a letter indicating their orbital angular momentum ("S" in the illustrated embodiment) and their principal quantum number. In the context of superposition states, "transition" encompasses movements of superposition states away from one state and toward another state.

Outputs from photon system 102 are represented in FIG. 1 by the transitions they can cause under certain conditions. For example, a laser pulse 110 can cause a transition between an excited |1> state and a Rydberg |50S> state provided the target atom is in the |1> state or the |50S> state and provided the transition is not precluded, e.g., by a Rydberg blockade. Pulse 110 is a $\pi$ pulse, which causes a single-direction transition, either from |1>→|50S> or vice versa. Pulse 120 is also a $\pi$ pulse, so it can cause a one-way transition between the |1> state and the |70S> state.

Pulse 120 differs from pulse 110 in that the principal quantum number (energy) of pulse 120 is 70 versus 50 for pulse 110. The higher principal quantum number can be achieved using a shorter wavelength (higher energy) photon for pulse 120. The wavelengths required to transition directly to Rydberg states with principal numbers ranging from 50 to over 110 are within the ultraviolet range, around 318 nanometers (nm). In the illustrated embodiment, it is more convenient to effect the transitions using visible and infrared light pulses. Thus, the transitions can be divided into steps: first transitioning from |1> to |7P3/2> using a 459 nm pulse; and second transitioning from |7P3/2> to the target Rydberg state using a 1041 nm photon for |50S> and a 1040 nm to reach |70S>. In alternative embodiments, different intermediate states and/or more steps can be used to transition to respectively different Rydberg states.

Atom 112, in register 104, is shown in the context of an eye 114 and a Rydberg exclusion zone (REZ) 116. REZ 116 is populated with atoms that could be transitioned to Rydberg states; however, it can be difficult to predict the impact of Rydberg states in REZ 116, so such transitions are avoided. Atoms 106 are arranged on a 2-micron (μm) pitch in register 104. In alternative embodiments, atoms are arranged on different pitches, e.g., from 1 μm to 10 μm.

As shown in FIG. 1, the nearest neighbors of atom 112 can be seen within eye 114, indicating that the interaction strength of atom 112 in Rydberg state SOS is sufficient to reliably impact those nearest neighbors. However, the interaction strength of atom 112 in a Rydberg SOS state is insufficient for reliable interactions with Rydberg atoms within REZ 116. Accordingly, quantum computing system 110 precludes atoms within REZ 116 from entering a Rydberg state while atom 112 is in a Rydberg state. The transition induced by pulse 110 occurs only under certain conditions including an appropriate beginning state and an absence of an effective Rydberg blockade. Of course, atom 112 may begin in a superposition state, in which case one can say the transition occurs "to the extent" that atom 112 begins in the |1> state and that the transition involves moving a position probability distribution away from the |1> state and toward the Rydberg state.

Atom 122, in register 104, is shown in FIG. 1 in the context of the eye 124 and REZ 126 associated with its Rydberg 70S state. Due to the higher principal quantum number (70 vs. 50), eye 144 is large than eye 114 in that it contains more atoms (13 vs. 5) than the latter and for more distant connections (4 μm vs. 2 μm) than the latter. Also, REZ 126 is substantially larger than REZ 116. By way of comparison, the large eye provides for greater intra-gate connectivity, while the larger REZ reduces opportunities for inter-gate parallelism.

The transitions caused by pulses 110 and 120 occur during a time interval T1. Within time interval T1, there are several possible timing orders. In the event that the transitions are direct, they can be in parallel (e.g., using a pair of 318 nm lasers) or in rapid succession (e.g., using a single 318 nm laser). In the event that the transitions involve two or more sub-transitions, the sub-transitions can be in parallel, in rapid succession, or pipelined (e.g., atom 112 transitions to intermediate state, atom 122 transitions to intermediate state while atom 112 transitions to Rydberg 50S state, and atom 122 transitions to Rydberg 70S state).

Connections are made during a second time interval T2. A 2π pulse is applied to atom 132 (which is within eye 114). If and to the extent atom 132 begins in the |1> state and if and to the extent atom 112 is not in Rydberg 50S state, then atom 132 transitions to the Rydberg 50S state. In this case, an eye 134 for the connection is the intersection of eyes associated with atom 112 and atom 132, while a REZ 136 for the connection is a union of the REZs for atoms 112 and 132. Since pulse 130 is a 2π pulse, if the first pair of photons (459 nm and 1041 nm) causes a (partial or total) transition to Rydberg state 50S, the second photon pair causes a (partial or total) return to the excited |1> state, but with a phase flip. If atom 132 begins in the |1> state but the transition is blocked because atom 112 is in the Rydberg 50S state, then the transition does not occur: atom 132 remains in the |1> state and there is no phase flip. If atom 132 begins in the |0> state, there is no transition and no phase flip.

Analogous outcomes are applicable to atom 144 in making a 4 μm connection to atom 122. Connection eye 144 is the intersection of the eyes for atoms 122 and 142 and connection REZ 146 is the union of REZs for atoms 122 and 142. Accordingly, quantum computing system 100 precludes atoms within REZ 146 from entering Rydberg states to avoid low-fidelity interactions.

Those skilled in the art can recognize that states at time intervals T1 and T2 correspond to two-thirds of the execution of one possible implementation of a CZ gate. The state at time interval T3 is similar to the state at time T1, except that transitions are in the opposite direction (from Rydberg toward excited). If, in fact, the forward and back transitions occur, a phase flip relative to the original excited state is incurred. Also, the order of the steps in two-step transitions is reversed. For example, atom 112 being in Rydberg state 50S, a 1041 nm pulse causes a transition to the |7P3/2> state, and then a 459 nm pulse completes the transition to the excited state.

Figure 2:
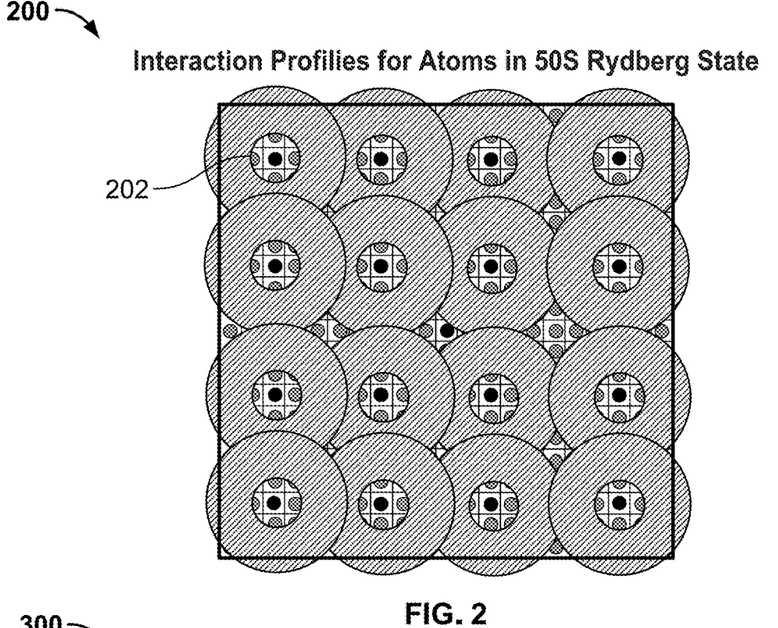
FIG. 2 is a schematic view of a quantum register showing packed interaction profiles for Rydberg state 50S.
Figure 3:
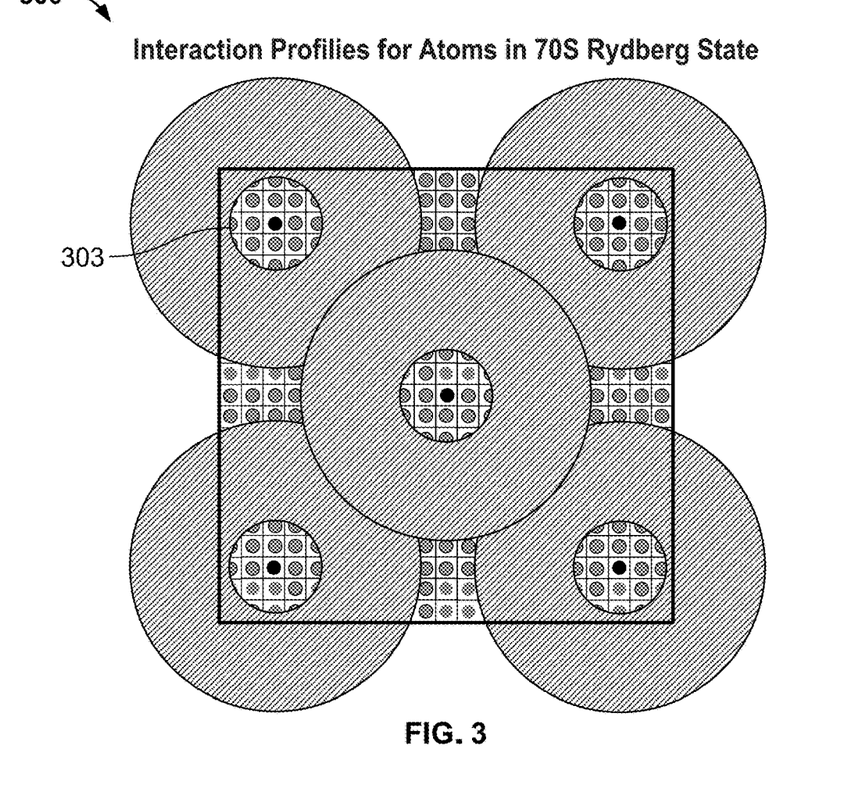
FIG. 3 is a schematic view of a quantum register showing packed interaction profiles for Rydberg state 70S.

An eye 144 for the atom pair 122 and 142 is larger than the eye for atom pair 112 and 132, and a REZ 146 for the former pair is larger than the REZ 136 for the latter pair. Eyes associated with the first Rydberg state only permit reliably impactful interactions between a Rydberg 50S atom and its four nearest neighbors, while eyes associated with the 70S Rydberg state permit reliably impactful interactions between a Rydberg 70S atom and about twelve nearest and next-nearest neighbors. On the other hand, as indicated by a comparison of FIGS. 2 and 3, Rydberg state 50S can pack about 16 gates 202 in an area for which Rydberg state 70S can pack only five gates 303. More generally, Rydberg states with higher principal quantum numbers provide for the more flexible and the more far-reaching connectivity associated with larger eyes, but reduced parallelism due to the larger REZs.

Figure 4:
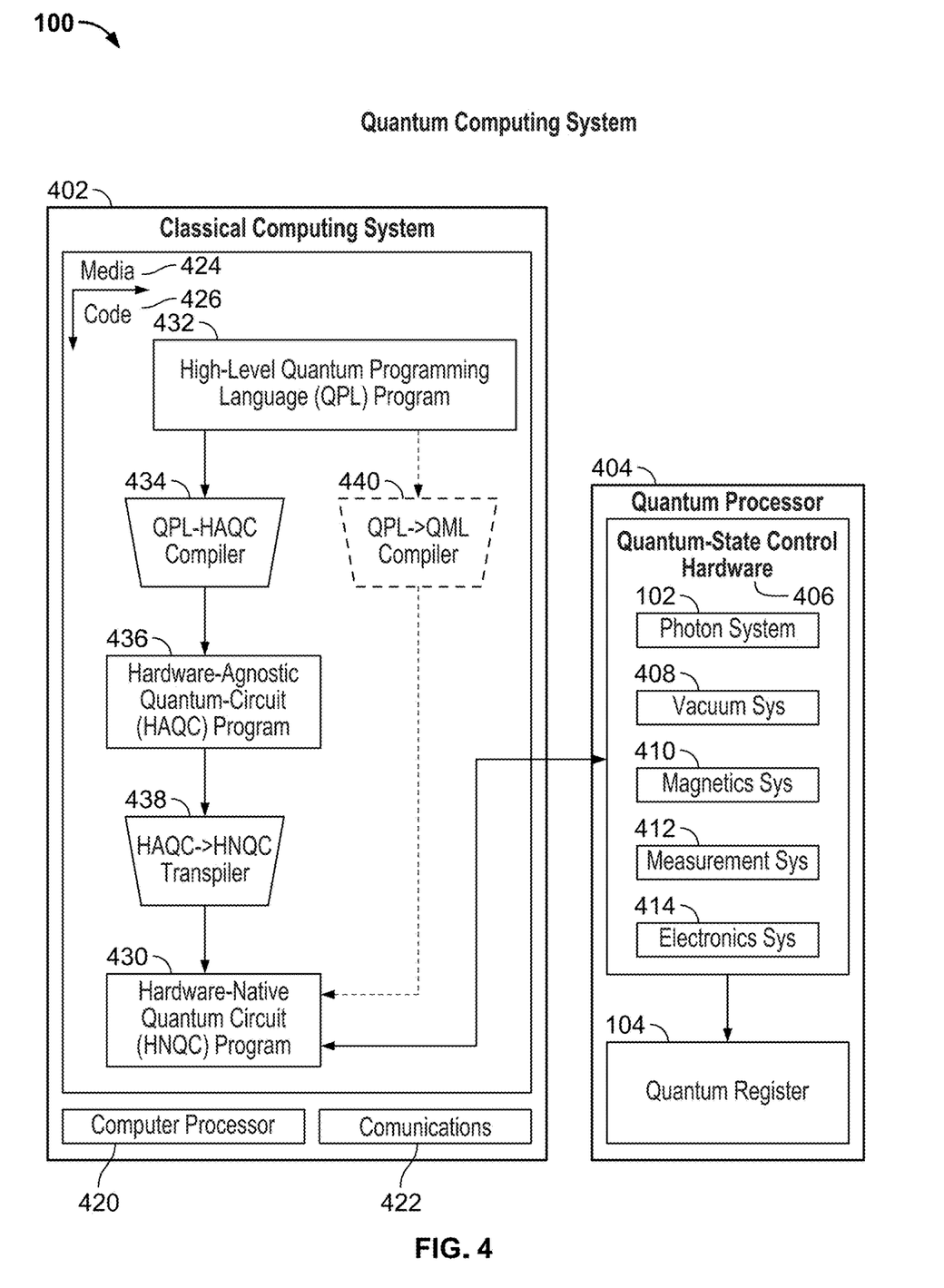
FIG. 4 is a schematic diagram of the quantum computing system of FIG. 1.

As shown in FIG. 4, quantum computing system 100 includes a classical computing system 402 and a quantum processor 404. Quantum processor 404 includes quantum register 104 and quantum-state control hardware 406. Quantum-state control hardware 406 includes photon system 102, a vacuum system 408, a magnetics system 410, a measurement system 412, and an electronics system 414.

Classical computing system 402 includes a computer processor 420, communications (including input/output) devices 422, and non-transitory computer-readable media 424. Media 424 is encoded with code 426 defining a hardware-native quantum circuit (HNQC) program 430. Herein, an "HNQC program" is a program of instructions that are executable by a quantum processor, in this case, quantum processor 404. HNQC programs are quite machine specific; for example, HNQC program 430 can run on quantum processor 404 and its functional equivalents. However, quantum-circuit program 430 cannot be expected to run on different models of quantum processors based on the same quantum technology, let alone of quantum processors based on different (e.g., superconductors vs. cold neutral atoms) technologies. Since each HNQC requires intimate knowledge of each respective quantum processor, it is rarely a programming language of choice.

Typically, programming is implemented using a high-level quantum programming language (QPL), such as Qiskit, e.g., yielding QPL program 432 in FIG. 4. A QPL-to-HAQC compiler can convert a QPL program 432 to a hardware-agnostic quantum-circuit (HAQC) program 436. HAQC program 436 is a description of a circuit defined by an arrangement of quantum gates. HAQC program 436 is intended to be generic across quantum technologies, and is not, in general, executable on any specific quantum machine. Accordingly, a hardware-specific transpiler 438 is used to convert HAQC program 436 to hardware-native quantum-circuit (HNQC) program 430. In accordance with the present invention, transpiler 438 tailors Rydberg states and thus interaction profiles on a per-gate basis to optimize tradeoffs between connection flexibility and parallelism.

In a variation, a QPL-to-HNQC compiler converts QPL program 432 directly to HNQC program 430 without first producing a HAQC program; in this variation, the present invention provides for compiler 440 to tailor Rydberg states to optimize tradeoffs between connectivity and parallelism. In another embodiment, an HNQC program is programmed directly, avoiding the need to compile. In other embodiments, tailoring of Rydberg states is introduced into the QPL program and/or the HAQC program.

Herein, an HNQC program includes an ordered set of instructions that, when executed using an appropriate quantum processor, realizes a (physical) quantum circuit by manipulating states of quantum-state carriers (QSCs). The HNQC program can define logical quantum-gate operations that are to be performed on information stored in logical QSCs. During execution, the program instructions are converted to hardware control signals, e.g., to control lasers, to realize the quantum-gate operations and thus the quantum circuit by manipulating the states of (physical) QSCs corresponding to the logical QSCs.

The QSCs of interest herein have states used to represent quantum information values and states used to control inter-QSC interactions; the states used to control QSC interactions include Rydberg states and may include non-Rydberg intermediate states. In the illustrated embodiment, the logical QSCs have only states corresponding to information values; however, some embodiments provide for logical QSCs with states for controlling interactions. In the illustrated embodiment, the basic unit of quantum information is the qubit which can assume values of 0, and 1, and superpositions of 0 and 1. Accordingly, the physical QSCs have two states use to represent quantum information values. More generally, the invention provides for qudits as the information units with a number n of basis states plus superpositions of those n basis states; the corresponding logical QSCs then have n quantum states used to represent the n basis values.

There are conflicting definitions of "qubit" in use. According to the definition used herein, "qubit" refers to a unit of information capable of assuming a first value (0), a second value (1), and probability distributions of those values. According to the definition not used herein, "qubit" refers to a two-state quantum system. The distinction is between a qubit as a unit of information and a qubit as an entity used to store that information. The distinction is apparent in cases in which a quantum-circuit program calls for moving a qubit value from one quantum-register location to another. In that case, only one qubit of information is moved, while two (sender and receiver) two-state systems are involved (neither of which are moved). Herein, the unit of information is called a "qubit", while the two-state systems are referred to as "quantum-state carriers" or "QSCs".

Herein, the distance between two QSCs of a multi-QSC quantum gate can be characterized as an "intra-gate, inter-QSC distance". Herein, the distance of two QSCs associated with respective different quantum gates executed in different regions of a QSC array is referred to as an "inter-gate distance".

Most types of quantum gates manipulate QSC states using intra-gate interactions between QSCs. Interactions between QSCs in states representing qubit values are sufficiently weak that the likelihood of their interaction causing an undesirable QSC-state manipulation is negligible. However, desired QSC-state manipulations can be effected by transitioning QSCs to Rydberg states, for which the interaction strength correlates with a principal quantum number of a Rydberg state. For example, a Rydberg state 70S, for which the principal quantum number is 70, has a stronger interaction strength at a given distance than does a Rydberg state 50S, which has principal quantum number 50. Interaction strength falls off with distance, so the minimum principal quantum number required to practically guarantee the desired QSC-state manipulation increases with the distance between the involved QSCs.

On the other hand, the greater interaction strength associated with higher principal quantum numbers increases the risk of unwanted QSC-state manipulations, e.g., between QSCs of different gates due to unwanted inter-gate interactions. Therefore, the minimum distance between gates that are to be operated concurrently (in parallel), must be greater when Rydberg states with higher principal quantum numbers are used. Unfortunately, the greater minimum distances result in fewer opportunities for gate parallelism, lower performance, and increased risk of information loss due to decoherence.

Accordingly, quantum circuit design should strive to balance: 1) the requirement for reliable results from intra-gate interactions, with 2) the goal of maximizing parallelism, throughput, and accuracy. If a single Rydberg state is used for all interactions required for a circuit, an interaction field strength sufficient for the gate with the most-distant interactions would be used for all gates and for all interactions. However, this "one-Rydberg-state-fits-all approach" limits the opportunities for parallel execution of quantum gates, which, in turn, lengthens the time required to execute the quantum circuit. The present invention optimizes this balance by tailoring Rydberg states at least on a gate-by-gate basis. For gates requiring intra-gate interactions over different distances (e.g., because different QSCs are involved), Rydberg states can be tailored on an interaction-by-interaction basis.

Figure 5:
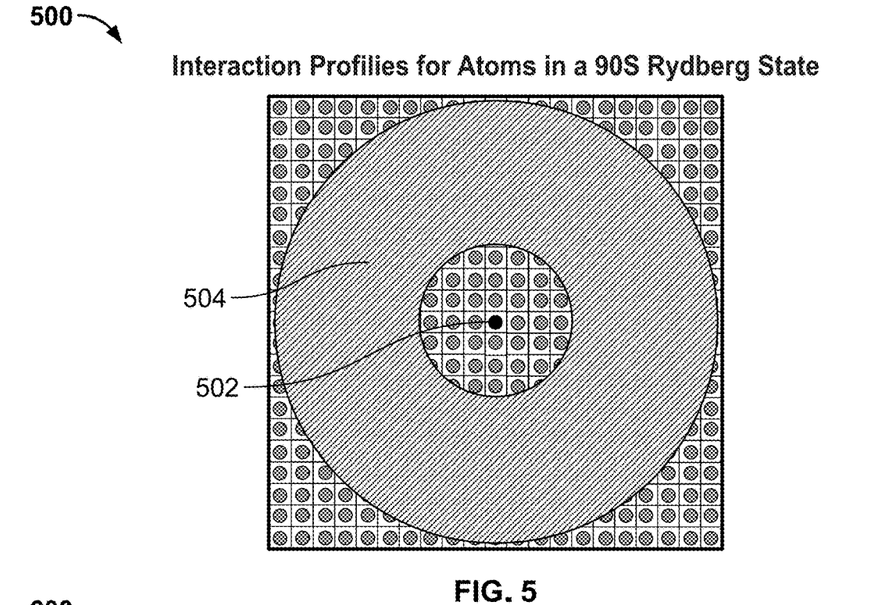
FIG. 5 is a schematic view of a quantum register in relation to an interaction profile for a Rydberg state 90S.
Figure 6:
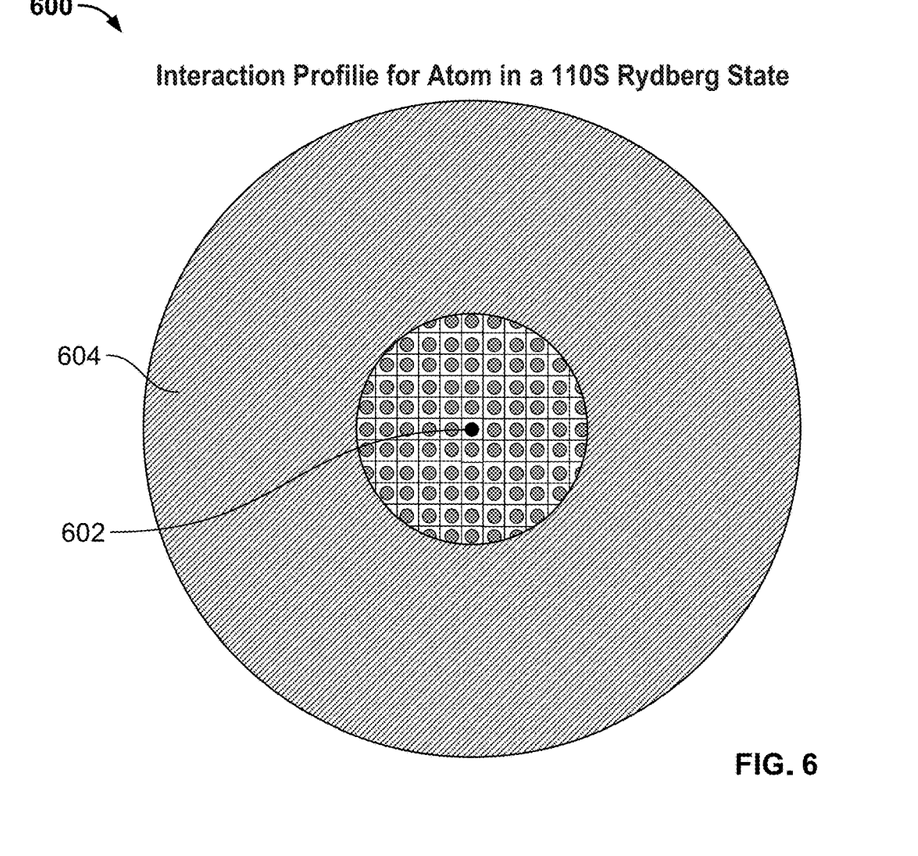
FIG. 6 is a schematic view of a quantum register in relation to an interaction profile for a Rydberg state 110S.

As explained above with reference to FIG. 1, quantum computing system 100 provides for: 1) exciting an atom 112 to its SOS quantum state to provide for nearest neighbor (2 μm) apart connections; and exciting an atom 122 to its 70S Rydberg state to provide for connections between atoms two atoms (4 μm) apart. In addition, a 90S Rydberg state can be used for connections three atoms (6 μm) apart, as shown in FIG. 5, and a 110S Rydberg state can be used for connections four atoms (8 μm) apart, as shown in FIG. 6. These examples are for illustration only. In fact, for some gate protocol, it may be that the interactions provided by the 50S state are sufficient to enable gates of acceptable fidelity for a four atom intra-gate distance (8 μm). Still, for any gate protocol, some similar relationship between distance and interaction strength and Rydberg excitation state will hold.

To achieve these Rydberg states, lasers with higher energies and shorter wavelengths, e.g., in the ultra-violet range, can be used. Alternatively, transitions between quantum information states and Rydberg states can be broken into steps so that lasers with lower energies and longer wavelengths (e.g., visible and infra-red) can be used. Furthermore, the discrete Rydberg levels specified are illustrative, any level (including other angular momentum states) in the Rydberg spectrum may be used and the levels used for each atom in a multi-qubit gate need not be identical.

As also can be seen from the extents of REZs 504 and 604 respectively in FIGS. 5 and 6, opportunities for parallelism are much reduced when these Rydberg states with higher principal quantum numbers are used. Of course, parallelism can still be achieved with more expansive registers, e.g., 100×100 atoms. Even with the registers as shown in FIGS. 5 and 6, significant parallelism can still be achieved as long as the Rydberg states with the higher principal quantum numbers are only used for some and not for other QSC interactions, gate protocols with more favorable limits on required strengths for connectivity and parallelism are employed, or relaxed requirements on gate fidelity impact from unfavorable interactions are accepted.

Figure 7:
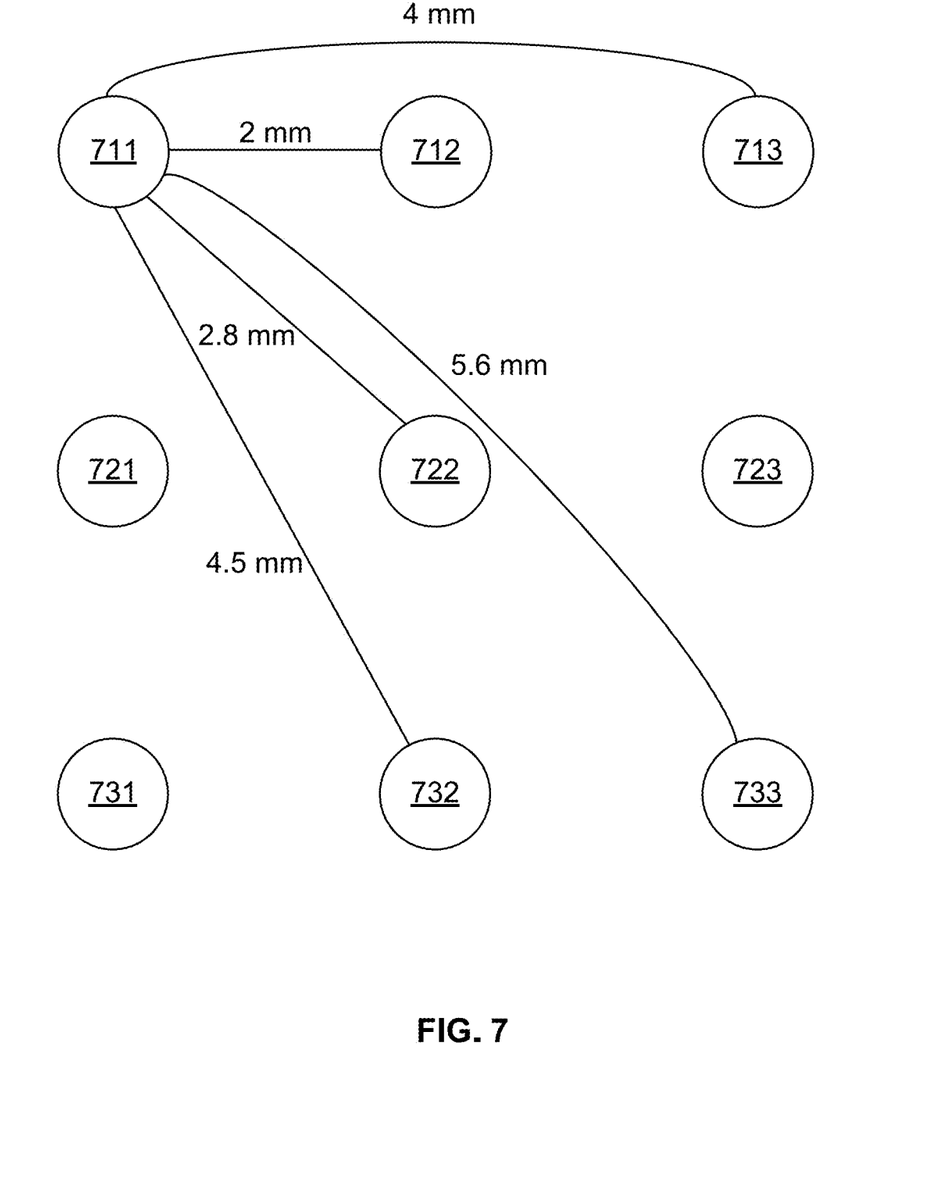
FIG. 7 is a schematic view of a set of atoms and connection distances between selected pairs of the atoms.

As shown in FIG. 7, connections can be made between atoms that are other than integer multiples of the register pitch, in this case 2 μm. While the connection distance between atoms 711 and 712 is 2 μm (1 atom pitch) and the connection distance between atoms 711 and 713 are integer multiples of the pitch (4 μm), the connection distances between atom 711 and atoms 722, 732, and 733, respectively are non-integer multiples (2.8 μm, 4.5 μm, and 5.6 μm). Thus, for example, a Rydberg state with a principal quantum number between 50 (used for 2 μm connections) and 70 (used for 4 μm connections) can be used for a connection between atoms 711 and 722. Likewise, Rydberg states with principal quantum numbers between 70 (used for 4 μm connections) and 90 (used for 6 μm connections) can be used for connections between atom 711 and atom 732 and between atom 711 and atom 733. Further refinements can be implemented by allowing the pitch in one dimension to differ from the pitch in the other. In addition to using "pure" Rydberg states, transitions to and from superpositions of Rydberg states can be used to refine tradeoffs between connectivity and parallelism.

Additional flexibility can be provided by varying the confidence levels (probabilities that interactions will have the desired impact) assigned to different interactions. Some interactions may be more resilient to errors or more tolerant of errors. Such interactions can be assigned lower confidence levels to achieve a more favorable tradeoff between connectivity and parallelism. The tradeoff between confidence level on the one hand and parallelism and connectivity on the other can be further understood with reference to energy vs distance graph 800 of FIG. 8. Four curves 802, 804, 806, and 808 show relations between interaction strength (in terms of energy expressed in Hertz (Hz)) and distance (expressed in microns) for four respective Rydberg states 50S, 70S, 90S, and 110S. Energy levels $10^8$ Hz and above correspond to hi-confidence interactions, while energy levels below $10^5$ Hz correspond to hi-confidence non-interactions, in other words, negligible unintended inter-gate perturbances.

In FIGS. 1-5, the eye perimeter (i.e., the inner REZ perimeter) corresponds to the $10^8$-minimum threshold, while the $10^5$ maximum threshold corresponds to the outer perimeters of the REZs. Dropping the intra-gate minimum threshold, for example, to $10^7$ increases intra-gate connectivity range and flexibility, while raising the $10^5$ maximum inter-gate interaction threshold to $10^6$ decreases the extent of the REZ and, thus, increases parallelism (at the cost of increased likelihood of error or use of other gate protocols with more favorable requirements on interactions).

Figure 8:
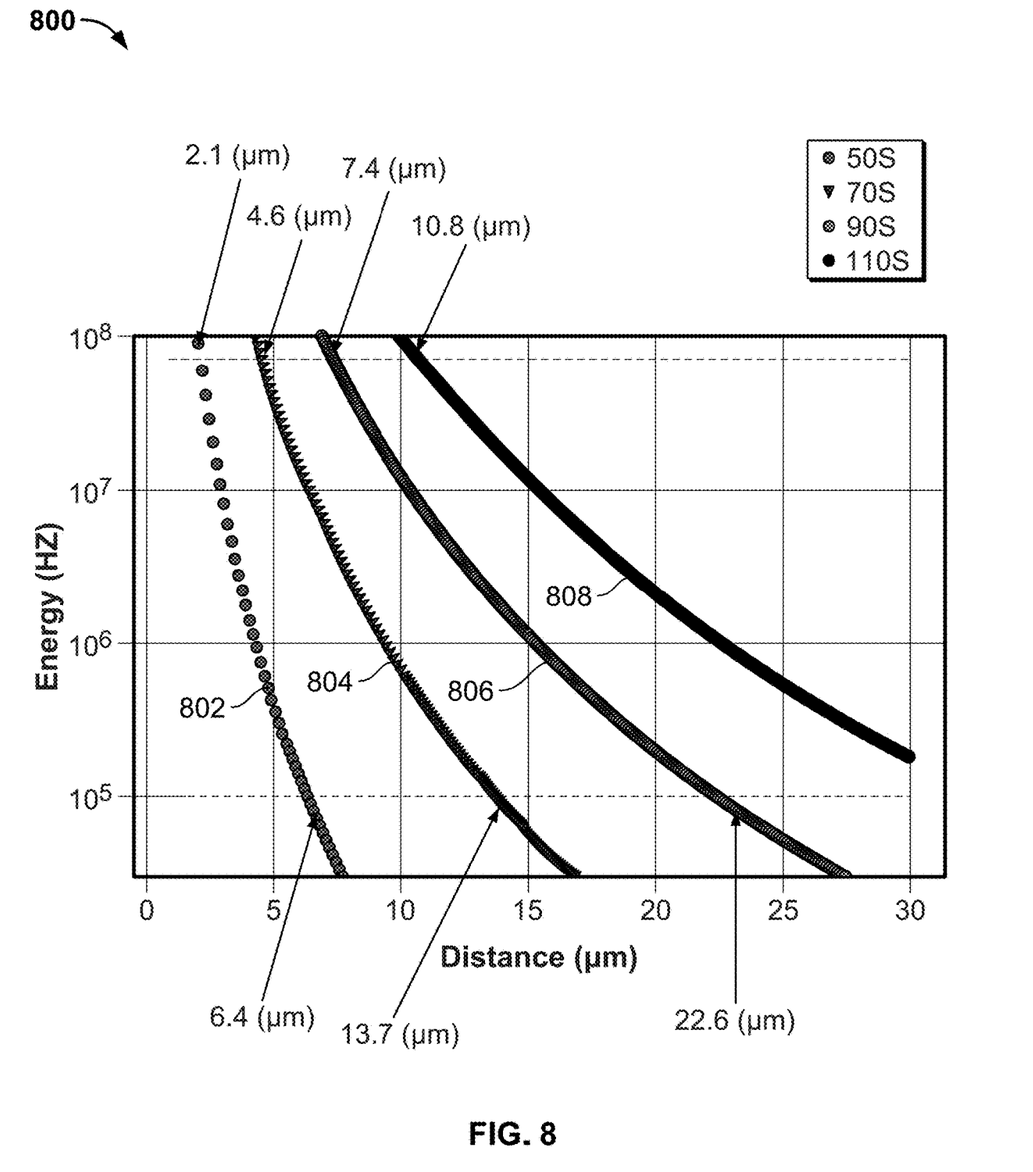
FIG. 8 is a graph of Energy in Hz, corresponding to interaction strength, as a function of distance from a Rydberg atom for excitation states 50S, 70S, 90S, and 110S.

Graph 800 shows that the sizes of the perimeters, and therefore of the eyes and the REZs increase with increasing principal quantum number (e.g., 50, 70, 90, and 110). In FIG. 8, the distances 2.1 μm, 4.6 μm, 7.4 μm, and 10.8 μm correspond to the radii of (the outer perimeter of) the single-QSC gate eyes for atoms respectively in the 50S, 70S, 90S, and 110S Rydberg states; the distances 6.4 μm, 13.7 μm, and 22.6 μm correspond to radii of (the outer perimeter of) the REZs for atoms respectively in the 50S, 70S, and 90S Rydberg states. The radius of the REZ for an atom in Rydberg state 110S is estimated to be at 32.4 μm.

For each curve, decreased energy correlates with increased distance. Accordingly, if the eye threshold is lowered from $10^8$ (e.g., to $10^7$), the eye increases in size and, concomitantly, connectivity increases; the cost is that the confidence that an expected interaction will occur is reduced. Complementarily, increased energy correlates with decreased distance. Accordingly, increasing the REZ threshold from $10^5$ (e.g., to $10^6$) shrinks the outer REZ perimeter and concomitantly, increases parallelism. The cost here is decreased confidence that Rydberg atoms outside the REZ are free of unwanted interaction impacts from the Rydberg atom associated with the REZ. Thus, increased parallelism and connectivity can be made available for gates that can tolerate lower confidence levels. Complementarily, parallelism and connectivity can be sacrificed (by shrinking the eye and increasing the REZ perimeter) where desirable to attain higher confidence levels.

Figure 9:
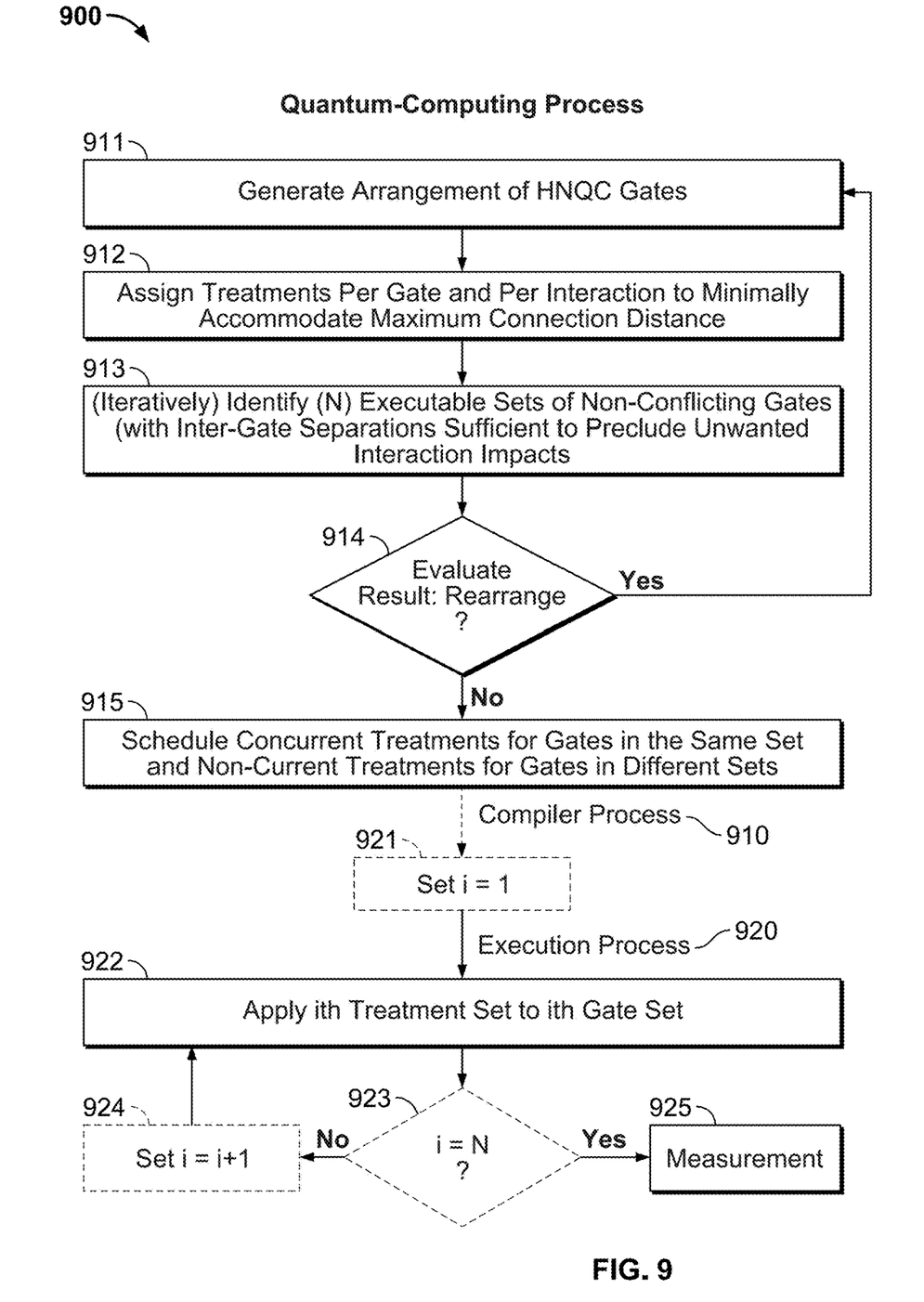
FIG. 9 is a flow chart of a quantum computing process.

A quantum-computing process 900, flow-charted in FIG. 9, includes a compiler process 910 and an execution process 920. Compiler process 910 can be implemented by HAQC-to-HNQC transpiler 438 or QPL-to-HNQC compiler 440 (FIG. 4). (A transpiler is a compiler for which the source and targets are at similar levels of abstraction.)

At 911, an arrangement of HNQC gates is generated. In some embodiments, a single circuit is generated; in alternative embodiments, plural circuits are generated, in which case, there will be multiple circuits that can be evaluated later in compiler process 910. At 912, treatments (e.g., laser pulses of various wavelengths) are assigned on a per-gate and/or interaction basis to minimally accommodate maximum connection distances. In the event a gate requires an interaction between nearest neighbors, a Rydberg state with a relatively low principal quantum number can be assigned. On the other hand, if a longer connection is required, a Rydberg state with a greater principal quantum number can be assigned. In a variation, adjustments to atom pitch in one or more dimensions are assigned at 912.

At 913, executable sets of non-conflicting gates are identified. A set of gates is "non-conflicting" if and only if no gate has a Rydberg atom that lies within the eye or REZ of a Rydberg atom in another gate of the set. In some scenarios, one set can include all gates of a circuit. In other scenarios, no set includes all gates of a circuit. In that case, one set is selected for implementation so that the included gates are to be executed in parallel. Those gates are then removed from consideration and another group of executable sets is identified in an iterative process that continues until all gates have been selected for implementation.

At 914, the resulting circuit is evaluated. If the evaluation is that a better circuit is required or desired, then process 900 returns to 911 from 914. Alternatively, some ad hoc adjustments can be made to improve the circuit that was evaluated. If the evaluation indicates that a circuit is satisfactory and that no more improvements are to be sought, then treatments are scheduled. At 915, concurrent treatments are scheduled from gates in the same set (as determined at 913). and non-concurrent treatments are scheduled for gates in different sets. The treatments can include exciting atoms to Rydberg states. Once scheduling is complete, the circuit is ready for execution.

If only one set is scheduled at 915, then it can just be implemented at 920. Execution process 920 is an iterative process if non-concurrent treatments were scheduled at 915. In that case, an iteration index i is initialized to unity (1) at 921. The first scheduled treatment is applied at 922. At 923, i is compared with the number N of sets in the circuit. If i<N, then the iteration index n is incremented at 924 and process 920 returns to 922 to apply treatments to the next set of gates. Once i=N, a measurement can be taken at 925, completing process 900.

Cold neutral atoms and cold-neutral polyatomic molecules are, by definition, electrically neutral, and therefore insensitive to electric and magnetic fields; this is in contrast to ions, which carry a net charge. The environmental insensitivity of the quantum states for cold neutral atoms makes them ideal for long-lived coherent quantum information storage but implies that the QSC-QSC interactions required for multi-QSC gate operations are not natively present. One approach in atom-based quantum computing is to make use of a "Rydberg" state in addition to the low-lying states in which the QSC is encoded to generate the required QSC-QSC interactions for multiqubit gate operations. The present invention also provides for using atomic and molecular ions as QSCs; for example, while an ion may be missing an electron, one of the other electrons can assume Rydberg states to strengthen inter-ion interactions.

Rydberg states are highly excited electronic states with large principal quantum numbers n. The atom's electric dipole moment scales as $n^2$, which means that the interaction between a pair of Rydberg excited atoms is strong for large n. The Rydberg-Rydberg interaction is generally dipole-dipole in nature at short distances (<Rc microns), scaling as $n^4/R^3$, and van der Waals at larger distances (>Rc microns), scaling as $n^{11}/R^6$, where R is the distance between the atoms and Rc is a crossover distance between the two scalings that depends on species, state, and the electric and magnetic environment. For a variety of parameters, Rc lies in the range of a few microns, generally between 1-10 microns. Thus, the interaction can be strong for nearby atoms, but still a weak perturbation for more distant atoms.

Multi-QSC gate operations make use of QSC-state-dependent excitation of Rydberg interactions. High fidelity gate operations require, on the one hand, sufficiently strong interactions, and on the other hand, sufficiently weak perturbations from interactions with QSCs that are not part of the subset. Thus, for high fidelity intra-gate interactions, the QSCs must be sufficiently close to each other; how close depends on the value of n used to generate the QSC-QSC interactions, the atomic species, the electromagnetic environment, and the details of the gate protocol. This implies that, in any Rydberg-interaction-based atom quantum computing architecture, the connectivity of a given QSC (the number of other qubits with which direct multi-QSC gate operations can be performed above a threshold of acceptable fidelity) depends not only on the spatial distribution of the entire QSC array, but also on the Rydberg level used (as well as the other parameters mentioned).

The requirement for sufficiently weak inter-gate perturbations implies a limit on gate parallelism, which is used herein to describe the number of simultaneous multi-QSC gates that can be run concurrently on a single QSC register. Because perturbations from interactions due to the Rydberg excitations involved in other simultaneous gates must be sufficiently weak, the QSCs involved in the separate simultaneous multi-QSC gate operations must be sufficiently distant from each other. How distant the gate operations must be from each other depends on details of the gate protocol employed, including the Rydberg level, n, used to generate the QSC-QSC interactions.

Since both a high degree of connectivity and a high degree of gate parallelism are desirable, the observations above imply a complex trade-off between connectivity and parallelism to determine the optimal choice of the Rydberg level used for gate operations. The optimal choice depends on how valuable connectivity and parallelism are for a given quantum circuit, or even a given time interval within operation of a given quantum circuit. The present invention provides for a Rydberg-interaction-based optimal use of connectivity vs. parallelism in the compilation of a given quantum circuit for operation on the computer. In particular, the present invention provides for using multiple Rydberg levels for excitation simultaneously to achieve an optimal tradeoff between parallelism and connectivity with each time interval of operation of a quantum circuit.

Another reason that having access to excitation of multiple Rydberg levels in a single Rydberg-atom quantum computing system is that the strength and magnitude of the Rydberg-Rydberg interaction can be tailored by excitation to superpositions of Rydberg levels, which allows even more fine-tuned control over the operation point within the trade space of QSC connectivity and gate parallelism. Furthermore, the ability to excite to multiple Rydberg levels opens up a rich space of gate protocols in which the various QSCs involved in a single multi-QSC gate operation are excited to different Rydberg levels or superpositions of Rydberg levels, which gives an additional parameter space for gate performance optimization. For example, excitation of control and target atoms to different Rydberg levels can, in some scenarios, improve the range of the interaction.

Neutral atom QSC registers consist of spatial arrangements of localized atoms. While register 104 (FIG. 1) has a regular, square, two-dimensional array with 2-μm spacing between QSCs, other embodiments provide for other register geometries (spacing, regularity, dimensionality, etc.). In addition, embodiments provide for a variety of gate protocols that have some dependence on the strength of the Rydberg blockade and all of which are subject to some perturbative effects due to weak interactions from distant Rydberg excitations. The nature of these dependencies can vary from protocol to protocol, with some being more sensitive than others. For example, in certain gate protocols, an imperfect Rydberg blockade can be corrected for by detailed tuning of the gate parameters. However, for any Rydberg gate protocol, some dependence on the Rydberg interaction strength can remain, making this invention valuable independent of the particular details of the gate protocols employed.

For example, the π-2π-π protocol, illustrated in FIG. 1, provides a sequence of quantum-state-dependent atom excitations that effects a phase flip on a target atom depending on the state of a control atom, i.e., a CZ gate. First, the control atom is excited to the Rydberg state with a "π pulse" if and only if it is in quantum state |1>. Next an attempt is made to excite the target atom from quantum state |1> to a Rydberg state and then to de-excite back to quantum state |1> using a 2π pulse 140, depicted in FIG. 10. Finally, a second π pulse de-excites the control atom from the Rydberg state. The "2π" target excitation and de-excitation can only succeed with high probability if the control atom is not in a Rydberg state, due to the Rydberg blockade. If the control atom is in a Rydberg state, the Rydberg-Rydberg interactions between target and control atoms shifts the energy level of the target atom Rydberg state by the blockade strength B, placing it far out of resonance so that the target excitation with Rabi frequency $\Omega \ll B$ does not succeed. Successful 2π excitation on the target atom results in application of a phase flip to the target quantum state. Similarly, traversal of the Rydberg state by the control atom due to the pair of π pulses results in a phase flip on the control quantum state.

The idealized state evolution through this procedure depends on the initial state as shown in Table 1.

TABLE 1

State Evolution for CZ Gate

| Initial State | After 1st control π pulse | After target 2π pulse | After 2nd control π pulse |
|---|---|---|---|
| \|0C0T⟩ | \|0C0T⟩ | \|0C0T⟩ | \|0C0T⟩ |
| \|0C1T⟩ | \|0C1T⟩ | −\|0C1T⟩ | −\|0C1T⟩ |
| \|1C0T⟩ | \|rC0T⟩ | \|rC0T⟩ | −\|0C1T⟩ |
| \|1C1T⟩ | \|rC1T⟩ | \|rC1T⟩ | −\|0C1T⟩ |

The state evolution matrix from initial to final state in the basis
$\{|0C0T\rangle, |0C1T\rangle, |1C0T\rangle, |1C1T\rangle\}$ is:

$$CZ = \begin{bmatrix} 1 & 0 & 0 & 0 \\ 0 & -1 & 0 & 0 \\ 0 & 0 & -1 & 0 \\ 0 & 0 & 0 & -1 \end{bmatrix}$$

There are various sources of error that affect this idealized picture of the state evolution. "Blockade leakage" limits the maximum distance between QSCs addressed by a gate. "Simultaneous gate shift" state perturbations due to distant Rydberg excitations lead to imperfect state excitation, which limits the minimum distance between sets of atoms simultaneously addressed by gates. Other sources of error also exist, but these illustrate the utility of the invention and are focused on here.

In the π-2π-π protocol all excitations use driving fields with constant amplitude and frequency. This makes a Rabi excitation model appropriate. Coherent excitation with constant frequency (detuning $\Delta$) and amplitude (Rabi frequency $\Omega$) results in a population oscillating between levels as:

$$P[\Omega_-, \Delta_-, t_-] := \frac{\Omega^2}{\Omega^2 + \Delta^2} \sin[2\pi\sqrt{\Omega^2 + \Delta^2}\, t/2]^2$$

Figure 10:
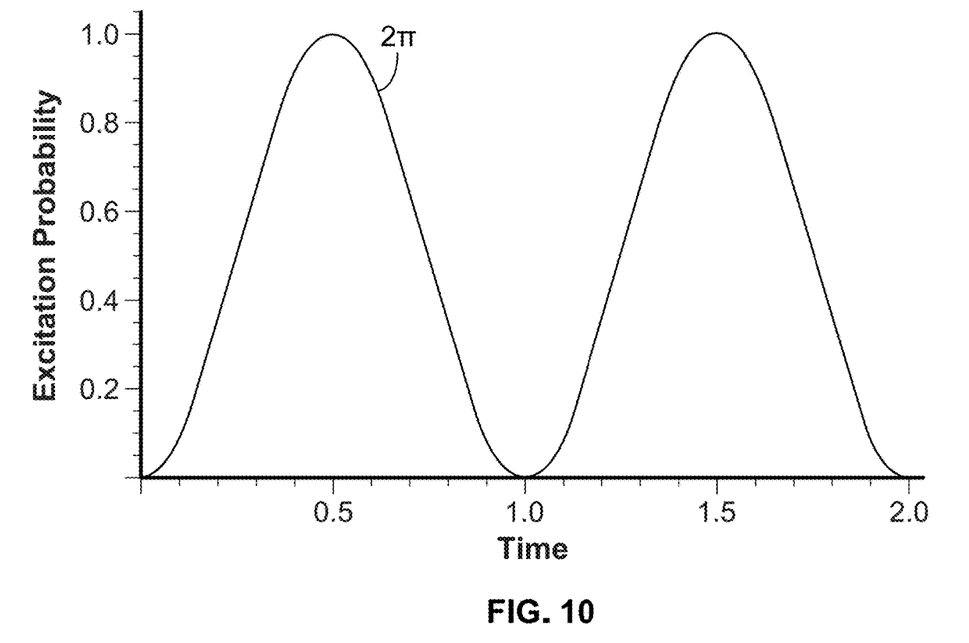
FIG. 10 is a graph of excitation probability as a function of time for a $2\pi$ pulse.

For zero detuning, this yields full amplitude Rabi oscillations as shown in FIG. 10. A "distant" simultaneous gate operation can result in a small perturbation to the Rydberg energy level which looks like an uncontrolled small detuning $\Delta = \delta sgs$. Expanding around $t\pi = 1/2\Omega$ for $x = \delta sgs2/\Omega2 \ll 1$ gives:

$$Pappx[x, \Omega, t] = (1-x)(1-2\pi^2 \Omega^2 t^2 (1+x))$$

Figure 11:
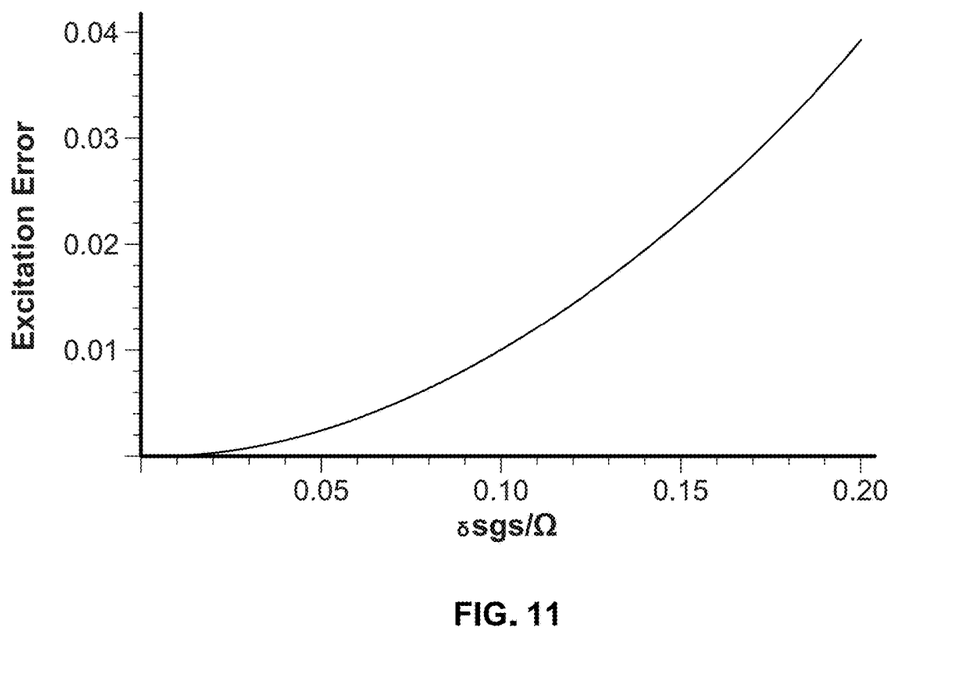
FIG. 11 is a graph of excitation error as a function of perturbation strength.

Assuming control errors are similarly small ($\Omega t \ll 1$), then to leading order the error ($\varepsilon = 1-P$) is simply $\epsilon[x] = -x$. So, as represented in FIG. 11, to achieve $\epsilon < 0.01$, then $\delta sgs/\Omega < 0.1$, and to achieve $\epsilon < 0.001$, $\delta sgs/\Omega < 0.03$.

When considering how near atoms need to be for high performance addressing with a blockade gate, consider the opposite limit $\Delta/\Omega \gg 1$. In this context, refer to $\Delta$ as B, the "blockade strength", and instead the population oscillates rapidly (at frequency B) with small amplitude ($\Omega^2/B^2$). If B is not well-controlled, then over many iterations, the excitation probability becomes $\Omega^2/2\, B^2$. Achieving $\epsilon < 0.01$ requires $B/\Omega > 7$, and $\epsilon < 0.001$ requires $B/\Omega > 23$. This is "blockade leakage error".

The balance between blockade leakage and error due to decay of the Rydberg excitation in the control atom gives the optimal theoretical Rabi frequency for CZ gates. In practice, a high Rabi frequency gives some insensitivity to spectroscopic errors as well, so a Rabi frequency somewhat higher is better. Additionally, as seen above, a high Rabi frequency reduces the distance between atom pairs on which CZ gates can be operated in parallel (or, said another way, a high Rabi frequency reduces the error from nearby simultaneous gate operations).

In summary, high performance requires a hierarchy of scales $B \gg \Omega \gg \delta sgs$. $B/\Omega > 23$ and $\Omega/\delta sgs > 30$ correspond roughly to gate errors on the scale of $10^{-3}$. Easily achievable Rabi frequencies are in the range of a few MHz. Take $\Omega = 3$ MHz as an example; then a blockade with error $<10^{-3}$ requires $B = 70$ MHz and simultaneous gate shift error $<(10^{-3})$ requires $\delta sgs < 100$ kHz.

It must be emphasized that, although the invention is herein illustrated in detail with respect to its consequences for parallelism and connectivity at a given error tolerance for the π-2π-π Rydberg CZ gate protocol, a similar tradeoff between parallelism and connectivity exists for any Rydberg-interaction-mediated gate protocol. Different gate protocols still have the same hierarchy of scales, although the relative values of the required blockade strength and simultaneous gate shift depend on the details of each protocol.

Given the decaying strength of the Rydberg-Rydberg interaction with distance, these requirements correspond roughly to requirements on the maximum separation between QSCs addressed by a CZ gate, $R_{conn}$, and the minimum separation between pairs of QSCs addressed by separate simultaneous CZ gates, $R_{sim}$. Further, the magnitude and range of the Rydberg-Rydberg interaction depends on the Rydberg state that is being used (characterized variously by a set of quantum numbers {n, j, l, s, mj, ml, ms}), the electromagnetic environment, and the speed with which the gate protocol is operated. Thus, $R_{conn}$ and $R_{sim}$ can be dynamically tuned to optimize a particular set of gate operations that are desired across a given quantum register by dynamically varying the gate protocol speed (e.g., using timing instructions in the quantum-circuit program 430 and photon system 102) the Rydberg states involved, and/or the background electric and magnetic fields (e.g., using electronics system 414 and/or magnetics system 410 of FIG. 4). This observation has general applicability to quantum computing architectures using Rydberg interactions to mediate multi-QSC gate operations The CZ gate operation and other multi-QSC gate operations can, in effect, be performed using only the 50S Rydberg state. To this end, a CZ gate can be implemented between an atom and a nearest neighbor. Then the state of the nearest neighbor can be swapped with the next nearest neighbor. The disadvantage is that an extra step is required which amounts to a performance hit relative to using a Rydberg state with a higher principal number and taking advantage of the concomitant greater connection flexibility. This performance hit suffered by one gate can be offset by the greater number of gates that can be implemented in parallel when using Rydberg states with lower principal quantum numbers. Note that quantum computer system 100 permits REZs to overlap.

The present invention provides for optimizing tradeoffs between connectivity and parallelism in quantum technologies in addition to those based on cold neutral atoms and can apply to technologies based on neutral and charged polyatomic and monatomic molecules.

Another approach to optimizing the tradeoff between connectivity and parallelism is to adjust the pitch (aka, spacing) of the atoms, e.g., by tuning the lasers used to form array traps that define the registers. Typically, the horizontal spacing and vertical spacing can be adjusted independently. Increasing spacing reduces connectivity and increases parallelism, while decreasing spacing increases connectivity and decreases parallelism. This approach can be used in addition to the previously described approaches and in lieu thereof.

Herein, "molecule" refers to the smallest particle of a substance that retains all the properties of the substance and is composed of one or more atoms; this definition, which is set forth in the Merriam Webster Dictionary, encompasses monatomic (single-atom) molecules as well as polyatomic molecules. Thus, gas-phase alkali (e.g., potassium, rubidium, and cesium) atoms used in embodiments herein qualify as molecules under this definition. An alternative definition set forth in the IUPAC Gold Book, "An electrically neutral entity consisting of more than one atom", is not used herein.

Herein, molecules are transitioned from a state representing a logical value to a Rydberg state (or superposition of Rydberg states) and vice versa. In the illustrated embodiment, transitions are between an excited state |1> to a Rydberg state. The transitions can be direct, e.g., using a single laser wavelength to effect the transition, or indirect, e.g., using a first laser wavelength to transition to an intermediate state and then a second laser wavelength to transition from the intermediate state to the target Rydberg state. In other embodiments, transitions are possible from other logical value states; for example, from a ground state |0> to a Rydberg state.

Herein, a quantum gate typically includes two or more molecules, at least one of which is to be transitioned to a Rydberg state. A molecule may be assigned a single Rydberg state or plural Rydberg states, e.g., to be used in different interactions during circuit execution. The molecules of a gate may use the same Rydberg state or states or may be assigned different Rydberg states.

Herein, an "interaction range" is a range within a quantum register of direction and distance vectors over which interactions can occur to a given range of confidence levels between a Rydberg molecule in a given quantum state and another molecule. Herein, there are three interaction ranges for a subject molecule in a Rydberg state: 1) a range within which another molecule in the same Rydberg state would interact with the subject molecule to a given first confidence level; 2) a range wherein another molecule in the same Rydberg state would not interact with the subject molecule to a given second confidence level; and 3) a REZ range that extends between ranges 1 and 2.

As defined herein, a first event occurs "while" a second event occurs implies the events are "concurrent". Herein, "concurrent" means "overlapping in time". Two treatments can be "concurrent" whether or not they begin at the same time and whether or not they end at the same time. Herein, "concurrent" has a broader meaning than "simultaneous", which requires some form of synchronization that "concurrent" allows but does not require.

Typically, potential interactions between a molecule in the given Rydberg state and a molecule in the third range could be avoided due to the uncertainties of their interactions. Herein a "cold neutral atom" is an atom with no net charge and with a temperature below one milli-kelvin. The terms "first" and "second" are used to cover elements that may be the same or different, unless additional language is used to indicate they cannot be the same. Herein, two gates are "separate" if they do not share a QSC.

Herein, art labeled "prior art", if any, is admitted prior art; art not labelled "prior art", if any, is not admitted prior art. The illustrated embodiments, variations thereupon and modifications thereto are provided for by the present invention, the scope of which is defined by the following claims.

What is claimed is:

1. A quantum-circuit execution process comprising:
    transitioning a first molecule of a first quantum gate of a quantum circuit from a first non-Rydberg state to a first Rydberg state, the first Rydberg state having a first principal quantum number; and
    transitioning a second molecule of a second quantum gate of the quantum circuit to transition from a second non-Rydberg state to a second Rydberg state, the second quantum gate being separate from the first quantum gate, the second Rydberg state having a second principal quantum number greater than the first principal quantum number wherein:
    the first quantum gate is characterized by a first maximum connection distance over which molecules of the first quantum gate must, under a first plurality of certain conditions, interact, the first Rydberg state being based on the first maximum connection distance; and
    the second quantum gate is characterized by a second maximum connection distance over which molecules of the first quantum gate must, under a second plurality of certain conditions, interact, the second Rydberg state being based on the second maximum connection distance, the second maximum connection distance being greater than the first maximum connection distance.

2. The quantum-circuit execution process of claim 1 wherein the first molecule and the second molecule are monatomic molecules, and the monatomic molecules are atoms.

3. The quantum-circuit execution process of claim 1 wherein the second molecule is in the second Rydberg state while the first molecule is in the first Rydberg state.

4. The quantum-circuit execution process of claim 1 wherein the method further includes:
    precluding a first plurality of molecules within a first interaction exclusion zone from entering Rydberg states while the first molecule is in the first Rydberg state; and
    precluding a second plurality of molecules within a second interaction exclusion zone from entering the Rydberg states while the second molecule is in the second Rydberg state, the second interaction exclusion zone being larger than the first interaction exclusion zone.

5. The quantum-circuit execution process of claim 1 further comprising transitioning a third molecule of a third quantum gate from a third non-Rydberg state to a third Rydberg state, the third Rydberg state being different from the first Rydberg state.

6. The quantum-circuit execution process of claim 5 wherein the first molecule serves as a control and the third molecule serves as a control target for the first molecule.

7. A quantum-circuit product comprising non-transitory computer-readable media encoded with code that, when executed using a quantum processor, implements a quantum-circuit-execution process including:
    transitioning a first molecule of a first quantum gate of a quantum circuit from a first non-Rydberg state to a first Rydberg state, the first Rydberg state having a first principal quantum number; and transitioning a second molecule of a second quantum gate of the quantum circuit to transition from a second non-Rydberg state to a second Rydberg state, the second quantum gate being separate from the first quantum gate, the second Rydberg state having a second principal quantum number greater than the first principal quantum number wherein:

the first quantum gate is characterized by a first maximum connection distance over which molecules of the first quantum gate must, under a first plurality of certain conditions, interact, the first Rydberg state being based on the first maximum connection distance; and the second quantum gate is characterized by a second maximum connection distance over which molecules of the first quantum gate must, under a second plurality of certain conditions, interact, the second Rydberg state being based on the second maximum connection distance, the second maximum connection distance being greater than the first maximum connection distance.

8. The quantum-circuit product of claim 7 wherein the first molecule and the second molecule are monatomic molecules, and the monatomic molecules are atoms.

9. The quantum-circuit product of claim 7 wherein the second molecule is in the second Rydberg state while the first molecule is in the first Rydberg State.

10. The quantum-circuit product of claim 7 wherein:

the quantum-circuit-execution process precludes molecules within a first interaction exclusion zone from entering Rydberg states while the first molecule is in the first Rydberg state; and the quantum-circuit-execution process precludes molecules within a second interaction exclusion zone from entering the Rydberg states while the second molecule is in the second Rydberg state, the second interaction exclusion zone being larger than the first interaction exclusion zone.

11. The quantum-circuit product of claim 7 further wherein the quantum-circuit-execution process further includes transitioning a third molecule of a third quantum gate from a third non-Rydberg state to a third Rydberg state, the third Rydberg state being different from the first Rydberg state.

12. A quantum-circuit processor comprising:

means for transitioning a first molecule of a first quantum gate of a quantum circuit from a first non-Rydberg state to a first Rydberg state, the first Rydberg state having a first principal quantum number; and means for transitioning a second molecule of a second quantum gate of the quantum circuit to transition from a second non-Rydberg state to a second Rydberg state, the second quantum gate being separate from the first quantum gate, the second Rydberg state having a second principal quantum number greater than the first principal quantum number wherein:

the first quantum gate is characterized by a first maximum connection distance over which molecules of the first quantum gate must, under a first plurality of certain conditions, interact, the first Rydberg state being based on the first maximum connection distance; and the second quantum gate is characterized by a second maximum connection distance over which molecules of the first quantum gate must, under a second plurality of certain conditions, interact, the second Rydberg state being based on the second maximum connection distance, the second maximum connection distance being greater than the first maximum connection distance.

13. The quantum-circuit processor of claim 12 wherein the first molecule and the second molecule are monatomic molecules, and the monatomic molecules are atoms.

14. The quantum-circuit processor of claim 12 wherein the second molecule is in the second Rydberg state while the first molecule is in the first Rydberg State.

15. The quantum-circuit processor of claim 12 wherein:

The quantum-circuit processor precludes a first plurality of molecules within a first interaction exclusion zone from entering Rydberg states while the first molecule is in the first Rydberg state; and The quantum-circuit processor precludes a second plurality of molecules within a second interaction exclusion zone from entering the Rydberg states while the second molecule is in the second Rydberg state, the second interaction exclusion zone being larger than the first interaction exclusion zone.

16. The quantum-circuit processor of claim 12 further comprising means for transitioning a third molecule of a third quantum gate from a third non-Rydberg state to a third Rydberg state, the third Rydberg state being different from the first Rydberg state.

* * * * *